United States Patent
Roddy

(10) Patent No.: US 7,424,913 B2
(45) Date of Patent: Sep. 16, 2008

(54) METHODS OF USING SUBSTANTIALLY HYDRATED CEMENT PARTICULATES IN SUBTERRANEAN APPLICATIONS

(75) Inventor: Craig W. Roddy, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 12/008,923

(22) Filed: Jan. 14, 2008

(65) Prior Publication Data

US 2008/0110619 A1  May 15, 2008

Related U.S. Application Data

(60) Division of application No. 11/388,644, filed on Mar. 24, 2006, now Pat. No. 7,341,104, which is a continuation-in-part of application No. 10/775,348, filed on Feb. 10, 2004, now Pat. No. 7,086,466.

(51) Int. Cl.
*E21B 43/04* (2006.01)
*E21B 43/267* (2006.01)

(52) U.S. Cl. .................... 166/278; 166/280.2; 166/309; 507/202

(58) Field of Classification Search ................. 166/276, 166/278, 280.1, 280.2, 308.3, 308.6, 309; 507/202, 269, 904, 924
See application file for complete search history.

(56) References Cited

U.S. PATENT DOCUMENTS

| | | | | |
|---|---|---|---|---|
| 2,952,318 A | * | 9/1960 | Ritch | 166/278 |
| 2,959,223 A | * | 11/1960 | Harmon et al. | 166/281 |
| 2,978,024 A | * | 4/1961 | Davis | 166/278 |
| 3,366,177 A | * | 1/1968 | Powers et al. | 166/276 |
| RE27,271 E | * | 1/1972 | Harnsberger et al. | 166/276 |
| 3,888,311 A | * | 6/1975 | Cooke, Jr. | 166/280.2 |
| 5,551,976 A | * | 9/1996 | Allen | 588/250 |
| 6,648,962 B2 | * | 11/2003 | Berke et al. | 106/696 |
| 7,086,466 B2 | * | 8/2006 | Roddy | 166/280.1 |
| 7,341,104 B2 | * | 3/2008 | Roddy | 166/280.2 |
| 2003/0089281 A1 | * | 5/2003 | Berke et al. | 106/713 |

* cited by examiner

*Primary Examiner*—George Suchfield
(74) *Attorney, Agent, or Firm*—Craig W. Roddy; Baker Botts, LLP

(57) ABSTRACT

Methods of gravel packing comprising providing a gravel packing fluid comprising a base fluid and substantially hydrated cement particulates, introducing the gravel packing fluid into a subterranean formation, and depositing at least a portion of the substantially hydrated cement particulates in the subterranean formation to form a gravel pack. Gravel packing fluids that comprise a base fluid, and gravel comprising substantially hydrated cement particulates. Methods of gravel packing and fracturing a subterranean formation comprising fracturing the subterranean formation so as to create or enhance one or more fractures in the subterranean formation; introducing a fluid comprising a base fluid and substantially hydrated cement particulates through a well bore into the one or more fractures; and depositing at least a portion of the substantially hydrated cement particulates in the one or more fractures in the subterranean formation and in the well bore to form a gravel pack.

24 Claims, No Drawings

METHODS OF USING SUBSTANTIALLY HYDRATED CEMENT PARTICULATES IN SUBTERRANEAN APPLICATIONS

CROSS REFERENCE TO RELATED APPLICATION

This patent application is a Divisional of U.S. patent application Ser. No. 11/388,644, filed Mar. 24, 2006 now U.S. Pat. No. 7,341,104, which is a Continuation-In-Part of U.S. patent application Ser. No. 10/775,348, filed Feb. 10, 2004, now U.S. Pat. No. 7,086,466, each disclosure of which is incorporated herein by reference in its entirety.

BACKGROUND

The present invention relates to substantially hydrated cement particulates. More particularly, the present invention relates to subterranean treatment fluids comprising substantially hydrated cement particulates and associated methods of use in subterranean applications.

Hydraulic fracturing is a process commonly used to increase the flow of desirable fluids, such as oil and gas, from a portion of a subterranean formation. Hydraulic fracturing operations generally involve introducing a fracturing fluid into a subterranean formation at or above a pressure sufficient to create or enhance one or more fractures in the formation. Enhancing a fracture includes enlarging a pre-existing fracture in the formation. The fracturing fluid may comprise particulates, often referred to as "proppant" that are deposited in the fractures. The proppant functions to prevent the fractures from fully closing upon the release of pressure, forming conductive channels through which fluids may flow to (or from) the well bore.

Another process that involves the use of particulates is gravel packing. A "gravel pack" is a term commonly used to refer to a volume of particulate materials (such as sand) placed into a well bore to at least partially reduce the migration of unconsolidated formation particulates into the well bore. Gravel packing operations commonly involve placing a gravel pack screen in the well bore neighboring a desired portion of the subterranean formation, and packing the surrounding annulus between the screen and the subterranean formation with particulate materials that are sized to prevent and inhibit the passage of formation solids through the gravel pack with produced fluids. In some instances, a screenless gravel packing operation may be performed.

Conventional particulates included as proppant and/or gravel in subterranean treatment fluids include, but are not limited to: sand; bauxite; ceramic materials; glass materials; polymer materials; Teflon® materials; nut shell pieces; seed shell pieces; fruit pit pieces; wood; composite particulates; cured resinous particulates comprising nut shell pieces, seed shell pieces, inorganic fillers, and/or fruit pit pieces; and combinations thereof. Conventionally, composite particulates that may be used comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. Sand is a common particulate utilized in subterranean treatment fluids as either proppant or gravel, but there may be issues related to supply and cost associated with using sand.

To modify one or more properties of a subterranean treatment fluid, various admixtures may be included in the subterranean treatment fluid. As used herein, the term "admixture" refers to materials, other than the base fluid used for making the subterranean treatment fluid, which may be added to the subterranean treatment fluid before or during its mixing. Admixtures oftentimes are provided in the form of liquids or soluble solids (e.g., powders). Attempts have been made to counteract the problems that may be associated with the delivery of admixtures in solid and liquid form. For instance, an admixture provided in powdered form may become dry compacted, or the admixture, in another instance, may be coated onto a carrier particle. However, improvements are needed for the delivery of admixtures into subterranean treatment fluids.

SUMMARY

The present invention relates to substantially hydrated cement particulates. More particularly, the present invention relates to subterranean treatment fluids comprising substantially hydrated cement particulates and associated methods of use in subterranean applications.

An embodiment of the present invention provides a method of fracturing a subterranean formation that comprises fracturing the subterranean formation so as to create or enhance one or more fractures in the subterranean formation; introducing a fracturing fluid comprising a base fluid and substantially hydrated cement particulates into the one or more fractures; and depositing at least a portion of the substantially hydrated cement particulates in the one or more fractures in the subterranean formation.

Another embodiment of the present invention provides a method of gravel packing that comprises providing a gravel packing fluid comprising a base fluid and substantially hydrated cement particulates, introducing the gravel packing fluid into a subterranean formation, and depositing at least a portion of the substantially hydrated cement particulates in the subterranean formation so as to form a gravel pack.

The features and advantages of the present invention will be readily apparent to those skilled in the art upon a reading of the description of the example embodiments, which follows.

DESCRIPTION OF PREFERRED EMBODIMENTS

The present invention relates to substantially hydrated cement particulates. More particularly, the present invention relates to subterranean treatment fluids comprising substantially hydrated cement particulates and associated methods of use in subterranean applications. While the substantially hydrated cement particulates of the present invention are useful in a variety of applications, they may be particularly useful when included in fracturing fluids as proppant or in gravel packing fluids as gravel.

The subterranean treatment fluids of the present invention generally comprise a base fluid and substantially hydrated cement particulates. In some embodiments, the substantially hydrated cement particulates may comprise an admixture. The substantially hydrated cement particulates may be included in the subterranean treatment fluid as proppant, gravel, lost circulation materials, carriers for admixtures, or combinations thereof.

The base fluids utilized in the subterranean treatment fluids of the present invention can be any fluid suitable for use as a base fluid in fracturing or gravel packing operations. Suitable base fluids include, but are not limited to, water, aqueous gels, viscoelastic surfactant gels, oil gels, gases, liquefied gases, liquefied hyrdocarbons, emulsions, and combinations thereof. Suitable aqueous gels are generally comprised of water and one or more gelling or viscosifying agents. Optionally, the aqueous gel further may comprise a crosslinking agent for crosslinking the gelling agent and further increasing the viscosity of the fluid. Suitable viscoelastic surfactant gels may comprise a viscoelastic surfactant and water. Suitable emulsions can be comprised of two immiscible liquids such as an aqueous liquid or gelled liquid and a hydrocarbon. Suitable water used in the base fluids can be fresh water, salt water (e.g., water containing one or more salts dissolved therein), brine (e.g., saturated salt water), seawater, or any other aqueous liquid that does not adversely affect other components in the subterranean treatment fluid. The base fluid may also be foamed or unfoamed as desired for a particular application and may include, for example, air, carbon dioxide, and/or nitrogen.

The subterranean treatment fluids of the present invention further comprise substantially hydrated cement particulates. The substantially hydrated cement particulates may be formed in any suitable manner. In certain embodiments of the present invention, the substantially hydrated cement particulates present in the subterranean treatment fluids of the present invention are formed by providing a settable composition comprising a hydraulic cementitious material and water; allowing the settable composition to set into a substantially hydrated mass; and comminuting the substantially hydrated mass into smaller particles so as to form the substantially hydrated cement particulates used in the methods of the present invention. In another embodiment, the settable composition further may comprise an admixture. By including an admixture in the settable composition, the substantially hydrated cement particulates formed using this settable composition should comprise the admixture. In another embodiment, after comminution of the substantially hydrated mass into the substantially hydrated cement particulates, the substantially hydrated cement particulates may be coated with at least one admixture. This permits the combination of admixtures that may not be compatible when used in solution. An example method for producing the substantially hydrated cement particulates and/or intermixing the admixtures therein is described in U.S. Pat. No. 6,648,962, the disclosure of which is incorporated herein by reference.

Comminution of the substantially hydrated mass to form the substantially hydrated cement particulates may be accomplished by any of a variety of suitable methods. For example, comminution may be achieved by subjecting the substantially hydrated mass to compressive or grinding forces, such as by using a jaw crusher, a roller crusher (e.g., opposed steel rollers), a ball mill, a disk mill, or a grinder. After comminution, the substantially hydrated cement particulates may be highly granulate with a high surface area, thereby providing a high loading surface.

The size of the substantially hydrated cement particulates may vary based upon the desired application. In certain embodiments, the substantially hydrated cement particulates may have an average diameter in the range of from about 5 micrometers to about 2.5 millimeters. However, it should be understood that, in other embodiments, the substantially hydrated cement particulates may have an average diameter of greater than about 2.5 millimeters or of less than about 5 micrometers as desired. One of ordinary skill in the art with the benefit of this disclosure will know the appropriate size of particulates for a particular application.

Generally, the hydraulic cementitious material used to form the substantially hydrated cement particulates may be any hydraulic cementitious material that is suitable for use in cementing operations. A variety of hydraulic cementitious materials are suitable for use, including those comprised of calcium, aluminum, silicon, oxygen, and/or sulfur, which set and harden by reaction with water. Such hydraulic cementitious materials include, but are not limited to, Portland cements, pozzolanic cements, gypsum cements, soil cements, calcium phosphate cements, high-alumina content cements, silica cements, high-alkalinity cements, slag cements, cement kiln dust, or mixtures thereof. "Cement kiln dust," as that term is used herein, refers to a partially calcined kiln feed which is typically removed from the gas stream and collected in a dust collector during the manufacture of cement. The chemical analysis of cement kiln dust from various cement manufactures varies depending on a number of factors, including the particular kiln feed, the efficiencies of the cement production operation, and the associated dust collection systems. Cement kiln dust generally may comprise a variety of oxides, such as $SiO_2$, $Al_2O_3$, $Fe_2O_3$, CaO, MgO, $SO_3$, $Na_2O$, and $K_2O$.

Vitrified shale also may be used to form the substantially hydrated cement particulates. Among other things, in some embodiments, vitrified shale may be included in the settable compositions used to form the substantially hydrated cement particulates. Such vitrified shale may react with lime present in, or added to, the settable composition to form a suitable cementing material, for example, calcium silicate hydrate. A variety of vitrified shales are suitable, including those comprising silicon, aluminum, calcium, and/or magnesium. Suitable examples of vitrified shale include, but are not limited to, PRESSUR-SEAL® FINE LCM material and PRESSUR-SEAL® COARSE LCM material, which are commercially available from TXI Energy Services, Inc., Houston, Tex.

The water utilized to form the substantially hydrated cement particulates can be fresh water, salt water (e.g., water containing one or more salts dissolved therein), brine (e.g., saturated salt water), or seawater. Generally, the water can be from any source, provided that it does not adversely affect other components in the settable composition. The water may be present in an amount sufficient to form a pumpable slurry. In certain exemplary embodiments, the water is present in the settable compositions of the present invention in an amount in the range of from about 30% to about 180% by weight of the hydraulic cementitious material. In certain embodiments, the water may be added to the hydraulic cementitious material, admixture(s), or both. In another embodiment, the water may be incorporated in an aqueous dispersion, emulsion, or solution containing the admixture(s).

In certain embodiments of the present invention, the substantially hydrated cement particulates further may comprise a zeolite. Zeolites generally are porous alumino-silicate minerals that may be either a natural or synthetic material. Synthetic zeolites are based on the same type of structural cell as natural zeolites, and may comprise aluminosilicate hydrates. As used herein, the term "zeolite" refers to all natural and synthetic forms of zeolite.

In certain embodiments of the present invention, the substantially hydrated cement particulates further may comprise an admixture. Among other things, this provides for the delivery of admixture(s) into a subterranean treatment fluid, for example, when the substantially hydrated cement particulates comprising an admixture are added to a settable composition. The admixture(s) may be provided as soluble solids (e.g., powders) or liquids. Any admixture commonly used in fracturing or gravel packing fluids may be included in the settable compositions. A wide variety of admixtures may be included in the subterranean treatment fluid, including, but not limited to, fluid loss control additives, surfactants, salts, defoamers, formation conditioning agents, expanding additives, flow enhancing additives, acids, corrosion inhibitors, breakers, crosslinking agents, viscoelastic surfactants, friction reducers, gelling agents, biocides, algicides, combinations thereof, and the like. One skilled in the art with the benefit of this disclosure will know the type of admixture to include for a particular application.

In certain embodiments of the present invention, after comminution of the substantially hydrated mass into the substantially hydrated cement particulates, the substantially hydrated cement particulates may be coated with at least one admixture. The coating of the admixture(s) onto the substantially hydrated cement particulates may be applied using any suitable coating method.

The amount of admixture or admixtures to include in the settable compositions, coat onto the substantially hydrated cement particulates, or both, should depend, inter alia, on the desired amount of the admixture(s) to incorporate into the subterranean treatment fluid. The desired amount of the admixture(s) to incorporate into the subterranean treatment fluid may depend, inter alia, on the type of admixture(s) employed. Generally, the admixture(s) may be included in the settable composition in an admixture(s)-to-hydraulic cementitious material weight ratio in the range of from about 5:95 to about 95:5. One of ordinary skill in the art with the benefit of this disclosure will know the appropriate amount of the admixture(s) to include in the settable composition for a particular application.

Among other things, the methods of the present invention may provide for the accurate measurement of the amount of the admixture(s) added to subterranean treatment fluids as well as avoiding time-consuming labor, energy costs, and processing complexity that may be associated with conventional methods for the delivery of admixtures into subterranean treatment fluids. An accurate measurement of the amount of admixture(s) in the subterranean treatment fluid may be obtained whether the admixture(s) is added to a settable composition, coated onto the substantially hydrated cement particulates, or both. For example, the amount of the admixture(s) introduced into the subterranean treatment fluid may be obtained by measuring the bulk weight of the substantially hydrated cement particulates and the relative amount of admixtures.

Typically, the substantially hydrated cement particulates may be included in a subterranean treatment fluid of the present invention in an amount sufficient for a particular application. In some embodiments, the substantially hydrated cement particulates are present in an amount up to about 30 pounds per gallon (ppg). In some embodiments, the substantially hydrated cement particulates are present in an amount up to about 23 ppg. In some embodiments, the substantially hydrated cement particulates are present in an amount up to about 12 ppg. One of ordinary skill in the art, with the benefit of this disclosure, will recognize the appropriate substantially hydrated cement particulates concentration of the subterranean treatment fluids for a chosen application.

Furthermore, additional additives may be added to the subterranean treatment fluids of the present invention as deemed appropriate by one skilled in the art. Examples of such additives include, but are not limited to, fluid loss control additives, lost circulation materials, surfactants, salts, formation conditioning agents, defoamers, acids, corrosion inhibitors, breakers, biocides, algicides, crosslinking agents, gelling agents, viscoelastic surfactants, friction reducers, expanding additives, flow enhancing additives, combinations thereof, and the like.

In one embodiment, the present invention provides a method of using a fracturing fluid in a subterranean formation comprising: fracturing the subterranean formation so as to create or enhance one or more fractures in the subterranean formation; introducing a fracturing fluid comprising a base fluid and substantially hydrated cement particulates into the one or more fractures; and depositing at least a portion of the substantially hydrated cement particulates in the one or more fractures in the subterranean formation. The substantially hydrated cement particulates deposited in the one or more fractures should prop the fractures so as to prevent them from fully closing. In some embodiments, hydrocarbons may be produced from the subterranean formation through the one or more fractures.

In one embodiment, the present invention provides a method of gravel packing comprising: providing a gravel packing fluid comprising a base fluid and substantially hydrated cement particulates; introducing the gravel packing fluid into a subterranean formation; and depositing at least a portion of the substantially hydrated cement particulates in the subterranean formation so as to form a gravel pack. In some embodiment the gravel packing fluid may be introduced into an annulus between a screen and the subterranean formation. In some embodiments, hydrocarbons may be produced from the subterranean formation through the gravel pack.

Therefore, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of gravel packing comprising:
   providing a gravel packing fluid comprising a base fluid and substantially hydrated cement particulates;
   introducing the gravel packing fluid into a subterranean formation; and
   depositing at least a portion of the substantially hydrated cement particulates into the subterranean formation to form a gravel pack.

2. The method of claim 1 wherein the base fluid is selected from the group consisting of water, an aqueous gel, a viscoelastic surfactant gel, an oil gel, a gas, a liquefied gas, a liquefied hydrocarbon, an emulsion, and combinations thereof.

3. The method of claim 1 wherein the substantially hydrated cement particulates comprises an admixture.

4. The method of claim 3 wherein the admixture comprises at least one material selected from the group consisting of a fluid loss control additive, a surfactant, a salt, a defoamer, a formation conditioning agent, an expanding additive, a flow enhancing additive, an acid, a corrosion inhibitor, a crosslinking agent, a breaker, a viscoelastic surfactant, a friction reducer, a gelling agent, a biocide, an algicide, and combinations thereof.

5. The method of claim 3 wherein the substantially hydrated cement particulates are coated with at least one additional admixture.

6. The method of claim 1 wherein the substantially hydrated cement particulates comprises at least material selected from the group consisting of Portland cement, a pozzolanic cement, a gypsum cement, a soil cement, a calcium phosphate cement, a high-alumina content cement, a silica cement, a high-alkalinity cement, a slag cement, cement kiln dust, a zeolite, vitrified shale, and mixtures thereof.

7. The method of claim 1 wherein the substantially hydrated cement particulates are coated with at least one admixture.

8. The method of claim 1 further comprising the steps of:
providing a settable composition comprising a hydraulic cementitious material and water;
allowing the settable composition to set into a substantially hydrated mass; and
comminuting the substantially hydrated mass into smaller particles so as to form the substantially hydrated cement particulates.

9. The method of claim 1 wherein the substantially hydrated cement particulates have an average particle diameter in the range of from about 5 micrometers to about 2.5 millimeters.

10. The method of claim 1 wherein the substantially hydrated cement particulates are present in the gravel packing fluid in an amount up to about 30 pounds per gallon of the gravel packing fluid.

11. The method of claim 1 wherein the gravel packing fluid is foamed.

12. The method of claim 1 wherein the gravel packing fluid is introduced into an annulus between a screen and the subterranean formation.

13. The method of claim 1 further comprising the step of producing hydrocarbons from the subterranean formation through the gravel pack.

14. A method of gravel packing comprising:
providing a gravel packing fluid comprising a base fluid and substantially hydrated cement particulates, wherein the substantially hydrated cement particulates have an average particle diameter in the range of from about 5 micrometers to about 2.5 millimeters and wherein the substantially hydrated cement particulates are present in the gravel packing fluid in an amount up to about 30 pounds per gallon of the gravel packing fluid;
introducing the gravel packing fluid into a subterranean formation; and
depositing at least a portion of the substantially hydrated cement particulates into the subterranean formation to form a gravel pack.

15. The method of claim 14 wherein the base fluid is selected from the group consisting of water, an aqueous gel, a viscoelastic surfactant gel, an oil gel, a gas, a liquefied gas, a liquefied hydrocarbon, an emulsion, and combinations thereof.

16. The method of claim 14 wherein the substantially hydrated cement particulates comprises an admixture.

17. The method of claim 16 wherein the admixture comprises at least one material selected from the group consisting of a fluid loss control additive, a surfactant, a salt, a defoamer, a formation conditioning agent, an expanding additive, a flow enhancing additive, an acid, a corrosion inhibitor, a crosslinking agent, a breaker, a viscoelastic surfactant, a friction reducer, a gelling agent, a biocide, an algicide, and combinations thereof.

18. The method of claim 16 wherein the substantially hydrated cement particulates are coated with at least one additional admixture.

19. The method of claim 14 wherein the substantially hydrated cement particulates comprises at least material selected from the group consisting of Portland cement, a pozzolanic cement, a gypsum cement, a soil cement, a calcium phosphate cement, a high-alumina content cement, a silica cement, a high-alkalinity cement, a slag cement, cement kiln dust, a zeolite, vitrified shale, and mixtures thereof.

20. The method of claim 14 wherein the substantially hydrated cement particulates are coated with at least one admixture.

21. The method of claim 14 further comprising the steps of:
providing a settable composition comprising a hydraulic cementitious material and water;
allowing the settable composition to set into a substantially hydrated mass; and
comminuting the substantially hydrated mass into smaller particles so as to form the substantially hydrated cement particulates.

22. The method of claim 14 wherein the gravel packing fluid is foamed.

23. The method of claim 14 wherein the gravel packing fluid is introduced into an annulus between a screen and the subterranean formation.

24. The method of claim 14 further comprising the step of producing hydrocarbons from the subterranean formation through the gravel pack.

* * * * *